United States Patent
Owens et al.

(12) 
(10) Patent No.: US 11,437,816 B2
(45) Date of Patent: Sep. 6, 2022

(54) STATCOM ARRANGEMENT WITHOUT PHASE REACTORS

(71) Applicant: Hitachi Energy Switzerland AG, Baden (CH)

(72) Inventors: Andrew Owens, Västerås (SE); Jon Rasmussen, Västra Frölunda (SE); Anton Niglis, Idkerberget (SE); Jasmin Selimovic, Västerås (SE)

(73) Assignee: HITACHI ENERGY SWITZERLAND AG, Baden (CH)

( * ) Notice: Subject to any disclaimer, the term of this patent is extended or adjusted under 35 U.S.C. 154(b) by 0 days.

(21) Appl. No.: 17/288,815

(22) PCT Filed: Nov. 27, 2018

(86) PCT No.: PCT/EP2018/082635
§ 371 (c)(1),
(2) Date: Apr. 26, 2021

(87) PCT Pub. No.: WO2020/108736
PCT Pub. Date: Jun. 4, 2020

(65) Prior Publication Data
US 2021/0359518 A1    Nov. 18, 2021

(51) Int. Cl.
*H02J 3/18* (2006.01)
*H02M 7/483* (2007.01)

(52) U.S. Cl.
CPC ......... *H02J 3/1857* (2013.01); *H02M 7/4835* (2021.05)

(58) Field of Classification Search
CPC ............ H02J 3/18; H02J 3/1857; H02M 7/42; H02M 7/44; H02M 7/48; H02M 7/483;
(Continued)

(56) References Cited

U.S. PATENT DOCUMENTS

| 8,760,120 B2 | 6/2014 | Hasler | |
| 2010/0315190 A1* | 12/2010 | Haj-Maharsi | H01F 27/40 336/192 |

(Continued)

FOREIGN PATENT DOCUMENTS

| CN | 101964596 A | 2/2011 |
| CN | 106786641 A | 5/2017 |

(Continued)

OTHER PUBLICATIONS

Machine English Translation of WO2019020195A1 obtained from espacenet.com on Apr. 9, 2022 (Year: 2022).*

*Primary Examiner* — Thienvu V Tran
*Assistant Examiner* — Ivan Laboy
(74) *Attorney, Agent, or Firm* — Slater Matsil, LLP

(57) ABSTRACT

A STATCOM arrangement includes an MMC and a transformer arrangement arranged to be an interface between the MMC and an AC grid. The MMC is connected in a wye topology with a plurality of converter arms, one for each phase of the AC grid, each arm including a plurality of chain-linked converter cells. The transformer arrangement is arranged to interface each of the arms of the MMC with a respective phase of the grid, and arranged to for each of the converter arms produce leakage reactance resulting in reactance in series with the arm which obviates the need for a phase reactor connected in series with said arm.

11 Claims, 2 Drawing Sheets

(58) Field of Classification Search
CPC ...... H02M 7/4835; H02M 7/49; H02M 7/537; H02M 7/5387; H02M 7/5388; H02M 7/797; H02M 2007/4835
See application file for complete search history.

(56) References Cited

U.S. PATENT DOCUMENTS

| | | | |
|---|---|---|---|
| 2011/0019449 A1 | 1/2011 | Katoh et al. | |
| 2012/0026767 A1* | 2/2012 | Inoue | H01F 27/42 363/89 |
| 2013/0099572 A1* | 4/2013 | Norrga | H02M 7/483 307/43 |
| 2013/0148392 A1* | 6/2013 | Inoue | H02M 7/10 363/68 |
| 2014/0254226 A1* | 9/2014 | Nakazawa | H02M 7/483 363/131 |
| 2014/0355321 A1* | 12/2014 | Akagi | H02M 7/497 363/131 |
| 2015/0236611 A1* | 8/2015 | Nakazawa | H02M 7/483 363/123 |
| 2018/0152021 A1 | 5/2018 | Shurina et al. | |

FOREIGN PATENT DOCUMENTS

| | | | | |
|---|---|---|---|---|
| CN | 106803719 A | 6/2017 | | |
| CN | 106849732 A | 6/2017 | | |
| CN | 107546984 A | 1/2018 | | |
| EP | 2541752 A1 | 1/2013 | | |
| JP | 2011223734 A | 11/2011 | | |
| JP | 2011223735 A | 11/2011 | | |
| JP | 2014108000 A | 6/2014 | | |
| JP | 2014140298 | 7/2014 | | |
| WO | 2011105177 A1 | 1/2011 | | |
| WO | WO-2017178480 A1 * | 10/2017 | ............ | G01R 27/18 |
| WO | 2018051587 A1 | 3/2018 | | |
| WO | WO-2019020195 A1 * | 1/2019 | ........... | H02H 7/1222 |

* cited by examiner

STATCOM ARRANGEMENT WITHOUT PHASE REACTORS

CROSS-REFERENCE TO RELATED APPLICATIONS

This application is a national stage application of International Application No. PCT/EP2018/082635, filed on Nov. 27, 2019, which application is hereby incorporated herein by reference.

TECHNICAL FIELD

The present disclosure relates to a Static Synchronous compensator (STATCOM) comprising a Modular Multilevel Chain-Link Converter (MMC) connected to an alternating current (AC) grid via a transformer.

BACKGROUND

MMC STATCOMs have today typically a delta (Δ) topology wherein each arm (sometimes also called leg or branch) comprises a plurality of series connected (also called chain-linked or cascaded) converter cells. Each cell typically has a full-bridge (FB), also called bipolar or bi-directional, topology. For each of the arms, a phase reactor (sometimes called a converter reactor) is connected in series with the cells, to provide required impedance. A charging circuit, comprising a resistor and a breaking switch is also typically used.

In order for a STATCOM to operate, the phase reactor is required to create a voltage difference between the chain-link converter and the grid. Reactive power generation is governed by $$Q = \frac{V_{chain-link}}{X_L} * (V_{grid} - V_{chain-link}). \quad (1)$$

Thus, the STATCOM generates reactive power by increasing or decreasing the chain-link voltage which then drives a current in the phase reactor. For reasons of electromagnetism, the phase reactors (e.g. each with a diameter of about 2 metres) are usually placed outside, separate from the valve hall of the MMC since they may otherwise e.g. cause currents in steel beams etc. of the hall.

It is generally desirable to reduce the physical footprint (size) of a STATCOM station, which is why it may be advantageous to remove components in order to save space. At the same time, the market price is decreasing, which drives the need to reduce costs. In the current, delta-connected topology, there is a requirement to close the delta connection, which requires busbars, supports, wall bushings, etc. This creates concerns around maintenance clearances to the phase reactors and takes up additional space.

SUMMARY

It is an objective of the present invention to provide a STATCOM arrangement allowing a reduced size of a corresponding STATCOM station, thus reducing cost thereof.

According to an aspect of the present invention, there is provided a STATCOM arrangement comprising an MMC and a transformer arrangement arranged to be an interface between the MMC and an AC grid. The MMC is connected in a wye topology with a plurality of converter arms, one for each phase of the AC grid, each arm comprising a plurality of chain-linked converter cells, typically each with full-bridge topology. The transformer arrangement is arranged to interface each of the arms of the MMC with a respective phase of the grid, and arranged to for each of the converter arms produce leakage reactance resulting in reactance in series with the arm which obviates the need for a phase reactor connected in series with said arm. Thus, the STATCOM arrangement does not have a phase reactor connected in series with any of the converter arms.

According to another aspect of the present invention, there is provided a STATCOM station comprising an embodiment of the STATCOM arrangement of the present disclosure, a valve hall enclosing the MMC, a transformer tank enclosing the transformer arrangement, and a bushing arrangement for a conductor electrically connecting the MMC with the transformer arrangement. The bushing arrangement passes through both a wall of the valve hall and a wall of the transformer tank. In some embodiments, the bushing arrangement comprises a bushing which same bushing passes through both the hall wall and the tank wall.

According to another aspect of the present invention, there is provided a method of providing reactance in a converter arm of an MMC connected in a wye topology to an AC grid via a transformer arrangement. The method comprises obtaining the reactance by leakage reactance from the transformer arrangement without the use of a phase reactor connected in series with the converter arm.

By means of the transformer arrangement producing sufficient leakage reactance to result in adequate reactance (and thus inductance) in the converter arms, the bulky phase reactors are no longer needed. Thus, the transformer tank may be positioned closer together with the valve hall, resulting in a smaller and denser design of the STATCOM station. For instance, a bushing passing through a wall of the transformer tank may also pass through a wall of the valve hall, reducing the complexity of the station design, further reducing cost of construction and maintenance.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

In accordance with the present invention, a STATCOM is configured using a wye-connected topology. Instead of using a phase reactor to provide the impedance for the necessary voltage difference between the grid and the MMC, the transformer leakage reactance is used. Overall, this reduces the number of components and the footprint, while simplifying the overall circuitry. This does not preclude the use of a (smaller) filter reactor in series with any of the converter arm. A filter reactor is a reactor, with the purpose of acting as a filter for harmonics or high-frequency emission, and which does not have the primary purpose of providing reactance for reactive power control in the converter arms. Such a filter reactor is typically much smaller than a phase reactor and can conceivably be placed within the valve hall.

Figure 1:
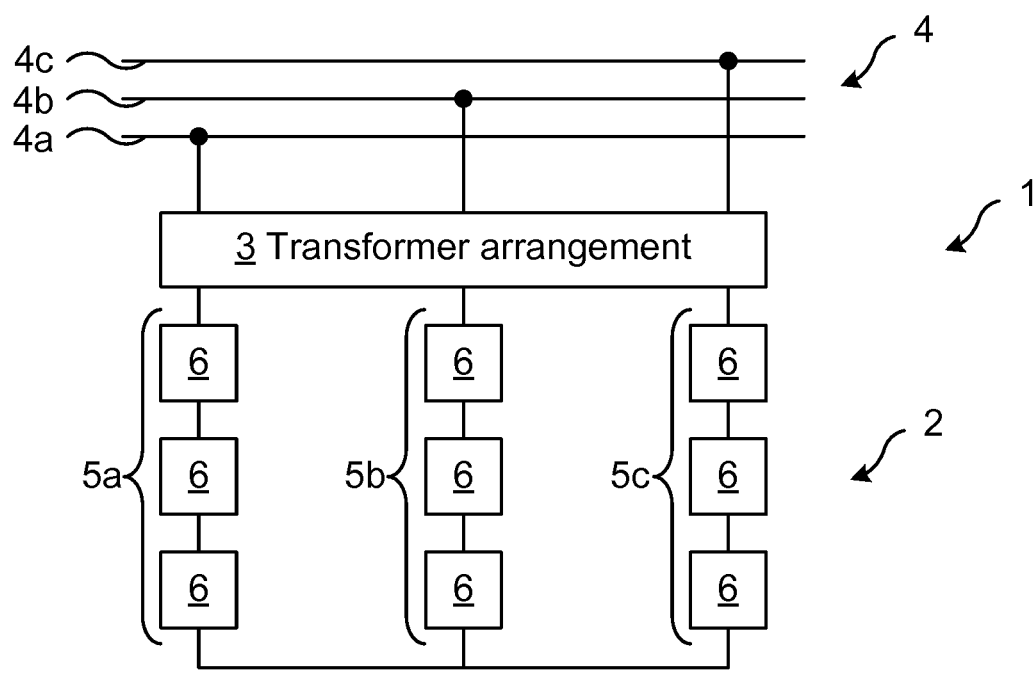
FIG. 1 is a schematic circuit diagram illustrating a STATCOM arrangement connected to an AC grid, in accordance with embodiments of the present invention.

FIG. 1 illustrates a STATCOM arrangement 1 connected to a AC grid 4. The STATCOM arrangement comprises an MMC 2 and a transformer arrangement 3 acting as an interface between the MMC and the grid. The MMC 2 has a wye topology with parallel converter arms 5. In the embodiment of FIG. 1, the AC grid 4 is a three-phase grid, and the MMC 2 comprises three converter arms 5a, 5b and 5c, one for each of the phases 4a, 4b and 4c of the grid 4. Each arm 5 is connected to its respective phase line of the grid via the transformer arrangement 3 which is configured to act as an interface between the higher voltage of the grid phase and the lower voltage of the converter arm. The grid 4 is typically a high-voltage (HV) grid.

Each converter arm 5 comprises a plurality of chain-linked (i.e. series connected) converter cells 6. The MMC 2 is configured to operate as a STATCOM, balancing the grid 4 by injecting (positive or negative) reactive power into the different phases of the grid by means of the valves and energy storages in the converter cells.

Figure 2:
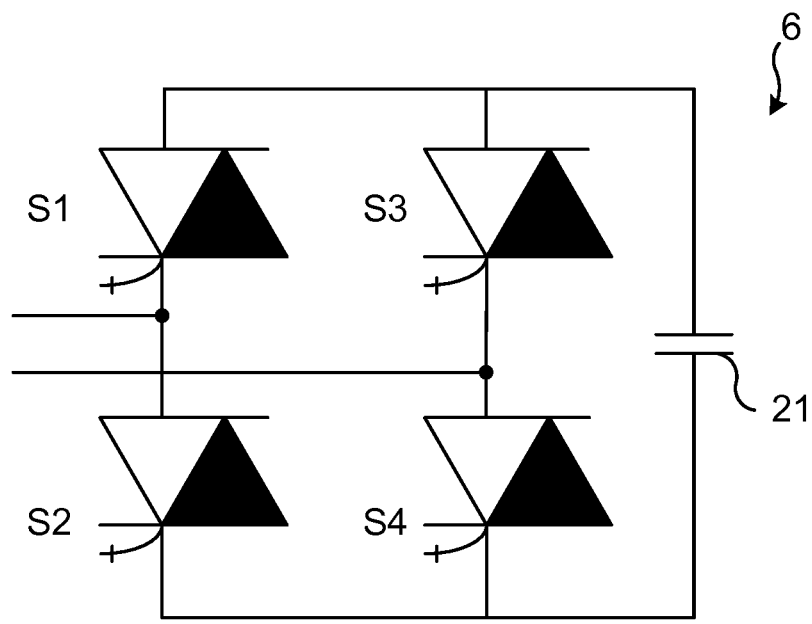
FIG. 2 is a schematic circuit diagram of a full-bridge converter cell, in accordance with embodiments of the present invention.

FIG. 2 illustrates an example embodiment of a full-bridge converter cell 6 which may be used in the MMC 2. The cell comprises an energy storage 21, e.g. comprising a capacitor, for instance a capacitor arrangement comprising a plurality of capacitors, a supercapacitor and/or a battery. Valves S are able to bypass the cell or to insert the cell in either direction (since the valves form a full-bridge topology and is thus bi-directional). In the figure, four valves S1, S2, S3 and S4 are used to form the full-bridge topology across the energy storage 21. Each valve may e.g. comprise a one-directional semiconductor switch and an antiparallel reverse-blocking semiconductor device. The reverse-blocking semiconductor device may e.g. comprise a diode. The semiconductor switch may e.g. comprise an Insulated-Gate Bipolar Transistor (IGBT) or an Integrated Gate-Commutated Thyristor (IGCT). In some embodiments, IGBTs may be preferred, as also schematically indicated in FIGS. 3a and 3b.

Figure 3A:
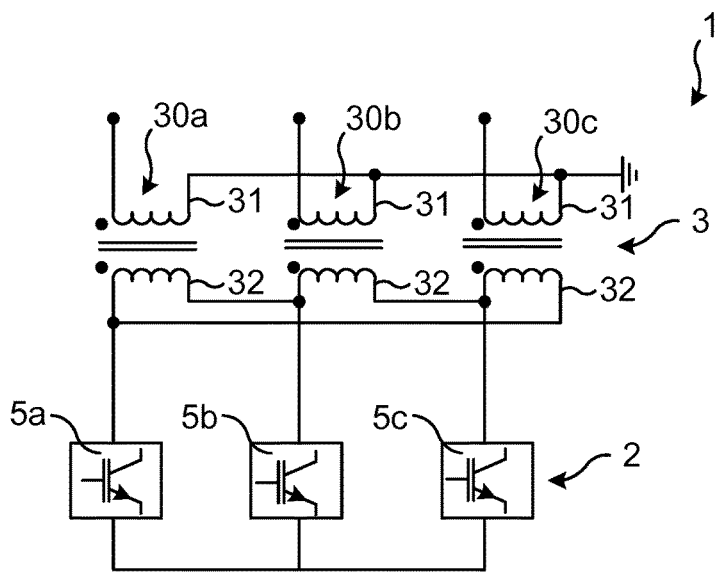
FIG. 3a is a schematic circuit diagram of a STATCOM arrangement wherein the MMC side of the phase transformers has a delta-topology, in accordance with embodiments of the present invention.

FIG. 3a is a schematic circuit diagram of a STATCOM arrangement 1 wherein an example of the transformer arrangement 3 is shown in more detail. For each phase of the grid 4, there is a phase transformer 30 acting as an interface between the phase line and the corresponding converter arm 5. For a three-phase grid, there are thus three phase transformers 30a, 30b and 30c, e.g. comprised in a three-phase transformer or in three single-phase transformers (often the use of a three-phase transformer is preferred), interfacing the respective three phase arms 5a, 5b and 5c with the corresponding three phase lines 4a, 4b and 4c. Each phase transformer 30 has a primary (grid) side 31, with a primary winding, and a secondary (MMC) side 32, with a secondary winding. In accordance with the embodiment of FIG. 3a, the MMC side 32 of the phase transformers are connected in a delta-topology, which may be preferred in some embodiments of the present invention.

Figure 3B:
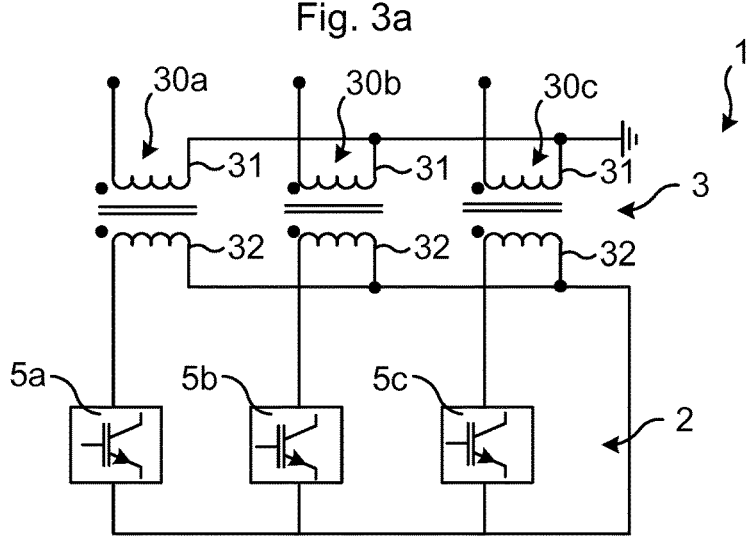
FIG. 3b is a schematic circuit diagram of a STATCOM arrangement wherein the MMC side of the phase transformers has a wye-topology, in accordance with embodiments of the present invention.

FIG. 3b is a schematic circuit diagram of a STATCOM arrangement 1 as in FIG. 3a, but wherein the MMC side 32 of the phase transformers 30 are connected in a wye-topology, which may be preferred in some other embodiments of the present invention.

Whether to choose a delta- or wye-topology for the MMC side 32 of the phase transformers 30 may depend on the application in view of the different order harmonics resulting from the different topologies. Often, however, a delta-topology is preferred. In some applications, it may be beneficial to ground the MMC side wye connection.

For the grid side 31 of the phase transformers, a wye-topology is typically used, as is also shown in FIGS. 3a and 3b.

By choosing a transformer arrangement 3 which has a leakage reactance which is typically significantly higher than normally desired, adequate inductance can be obtained in each of the converter arms 5 such that a phase reactor is not needed, allowing the STATCOM station 40 (see FIG. 4) to be significantly reduced in size (footprint), complexity and cost.

Figure 4:
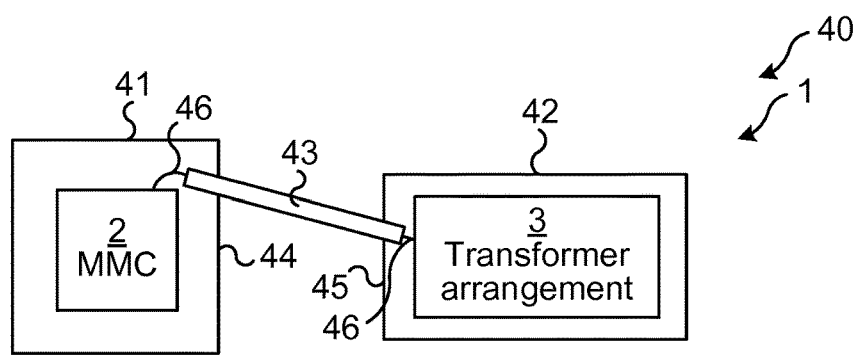
FIG. 4 is a schematic block diagram of a STATCOM station, in accordance with embodiments of the present invention.

FIG. 4 illustrates a STATCOM station 40. The station comprises, in addition to the STATCOM arrangement 1, a transformer tank 42 enclosing the transformer arrangement 3, a valve hall 41 enclosing the MMC 2, and a bushing 43 there between allowing a conductor 46 to pass there through to electrically connect the MMC and transformer arrangement to each other.

The valve hall 41 may typically be a house arranged to protect the MMC 2 from the environment.

The transformer tank 42 may be filled with an electrically insulating liquid, e.g. a transformer oil, in which the adequate parts, e.g. the phase transformers 30, of the transformer arrangement 3 may be immersed.

The bushing passes through both a wall 44 of the valve hall 41 and a wall 45 of the transformer tank 42. Since no phase reactors are used and thus positioned between the valve hall 41 and the transformer tank 42, the same bushing can pass through both walls 44 and 45, significantly reducing the complexity of the electrical connection between the MMC 2 and transformer arrangement 3. Only one bushing 43 is schematically shown in the figure, but (depending on the design of the MMC and transformer arrangement, any number of bushings 43 may be arranged between the MMC and the transformer arrangement, each allowing a conductor 46 to pass there through to electrically connect the MMC and transformer arrangement to each other.

That the same bushing 43 passes through both walls 44 and 45 is an option which may be most preferred in a footprint perspective. However, there may be reasons why this is not possible (fire proofing etc.), in which case separate bushings may be used, e.g. a transformer bushing passing through the tank wall 45 and a converter bushing passing through the hall wall 44, connected in series with each other.

A STATCOM station is typically rather big, especially for a HV grid 4, with a typical footprint of the valve hall 41 being 10 times 15 metres, and of the transformer tank 42 being 2 times 5 metres. When phase reactors are used, as in the prior art, these are typically placed outside and separated some distance from the valve hall 41 and the transformer tank 42 in order not to induce currents in the structures thereof. This distance, in combination with the size of the phase reactors themselves, e.g. 2 metres in diameter, to significantly add to the footprint of the station. The positioning of the phase reactors outside may also result in wear of the phase reactor casings as well as in a disturbing vibratory sound that may spread far from the station. To be able to avoid phase reactors by means of the present invention may thus significantly reduce the footprint of the station, and may also reduce the maintenance needed and reduce the disturbing sounds and magnetic and electric fields emitted by the station. It is noted that a smaller footprint may reduce the size of the antenna that radiates electric field that cause radio interference around the station 40.

In some embodiments of the present invention, the transformer arrangement 3 comprises a phase transformer 30 per phase of the grid 4, wherein the phase transformers are delta or wye connected on the MMC side 32 thereof, e.g. delta connected which is preferred in some embodiments. The choice between delta and wye topology can be made in view of the different resonances injected into the grid 4 for the different topologies.

In some embodiments of the present invention, the wye connected MMC 2 comprises three converter arms 5a, 5b and 5c for a three-phase AC grid 4. A three-phase system is a typical application for embodiments of the present invention, but any other number of at least two phases are also contemplated.

In some embodiments of the present invention, the wall 44 of the valve hall 41 and the wall 45 of the transformer tank 42 are positioned at a distance from each other of at most 10, 5 or 3 metres, e.g. within the range of 1-5 or 1-3 metres. When phase reactors are not used, the station can be more densely designed.

In some embodiments of the present invention, the bushing arrangement 43 comprises a bushing which same bushing passes through both the hall wall 44 and the tank wall 45. This is a preferred design of the bushing arrangement with reduced footprint and complexity.

In some embodiments of the present invention, the MMC 2 operates as a STATCOM for the AC grid 4, which is a typical application for the STATCOM arrangement 1.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A static synchronous compensator (STATCOM) station comprising:
   a STATCOM arrangement comprising a Modular Multi-level Chain-Link Converter (MMC) and a transformer arrangement arranged to be an interface between the MMC and an alternating current (AC) grid;
   wherein the MMC is connected in a wye topology with a plurality of converter arms, one converter arm for each phase of the AC grid, each arm comprising a plurality of chain-linked converter cells;
   wherein the transformer arrangement is arranged to interface each of the arms of the MMC with a respective phase of the AC grid;
   wherein the transformer arrangement is arranged to, for each of the converter arms, produce leakage reactance resulting in reactance in series with the arm, thereby obviating a need for a phase reactor connected in series with the arm;
   wherein there is no phase reactor connected in series with any of the converter arms; and
   wherein the STATCOM station further comprises:
      a valve hall enclosing the MMC;
      a transformer tank enclosing the transformer arrangement; and
      a bushing for a conductor electrically connecting the MMC with the transformer arrangement, the same bushing directly passing through both a wall of the valve hall and a wall of the transformer tank.

2. The STATCOM station of claim 1, wherein the wall of the valve hall and the wall of the transformer tank are positioned at a distance from each other of at most 10 meters.

3. The STATCOM station of claim 2, wherein the wye connected MMC comprises three converter arms for a three-phase AC grid.

4. The STATCOM station of claim 2, wherein the transformer arrangement comprises a phase transformer per phase of the AC grid, wherein the phase transformers are wye connected on an MMC side thereof.

5. The STATCOM station of claim 2, wherein the transformer arrangement comprises a phase transformer per phase of the AC grid, wherein the phase transformers are delta connected on an MMC side thereof.

6. The STATCOM station of claim 5, wherein the wye connected MMC comprises three converter arms for a three-phase AC grid.

7. The STATCOM station of claim 1, wherein the transformer arrangement comprises a phase transformer per phase of the AC grid, wherein the phase transformers are delta connected on an MMC side thereof.

8. The STATCOM station of claim 7, wherein the wye connected MMC comprises three converter arms for a three-phase AC grid.

9. The STATCOM station of claim 1, wherein the wye connected MMC comprises three converter arms for a three-phase AC grid.

10. The STATCOM station of claim 1, wherein the wall of the valve hall and the wall of the transformer tank are positioned at a distance from each other within a range of 1-5 meters.

11. The STATCOM station of claim 1, wherein the transformer arrangement comprises a phase transformer per phase of the AC grid, wherein the phase transformers are wye connected on an MMC side thereof.

* * * * *